United States Patent
Li

(10) Patent No.: US 10,396,368 B2
(45) Date of Patent: Aug. 27, 2019

(54) PEM FUEL CELL STACK

(71) Applicant: Wuhan Troowin Power System Technology Co., Ltd., Hubei (CN)

(72) Inventor: Xiao Li, Hubei (CN)

(73) Assignee: WUHAN TROOWIN POWER SYSTEM TECHNOLOGY CO., LTD., Hubei (CN)

( * ) Notice: Subject to any disclaimer, the term of this patent is extended or adjusted under 35 U.S.C. 154(b) by 524 days.

(21) Appl. No.: 14/942,951

(22) Filed: Nov. 16, 2015

(65) Prior Publication Data
US 2016/0072140 A1 Mar. 10, 2016

Related U.S. Application Data

(63) Continuation-in-part of application No. 14/029,762, filed on Sep. 17, 2013, now Pat. No. 9,225,025.

(60) Provisional application No. 61/803,072, filed on Mar. 18, 2013.

(51) Int. Cl.
| *H01M 8/02* | (2016.01) |
| *H01M 8/10* | (2016.01) |
| *H01M 8/0276* | (2016.01) |
| *H01M 8/1004* | (2016.01) |
| *H01M 8/0258* | (2016.01) |
| *H01M 8/0267* | (2016.01) |
| *H01M 8/0273* | (2016.01) |

(52) U.S. Cl.
CPC ....... *H01M 8/0276* (2013.01); *H01M 8/0258* (2013.01); *H01M 8/0267* (2013.01); *H01M 8/0273* (2013.01); *H01M 8/1004* (2013.01)

(58) Field of Classification Search
CPC ............ H01M 8/0258; H01M 8/0267; H01M 8/0273; H01M 8/0276; H01M 8/1004
See application file for complete search history.

(56) References Cited

U.S. PATENT DOCUMENTS

| 2003/0152819 A1* | 8/2003 | Hatoh | H01M 8/0221 429/437 |
| 2003/0186106 A1* | 10/2003 | Frank | H01M 8/0228 429/435 |
| 2004/0170878 A1* | 9/2004 | Goebel | H01M 8/0228 429/414 |
| 2008/0014486 A1* | 1/2008 | Unoki | H01M 8/0247 429/434 |
| 2008/0050638 A1* | 2/2008 | Peng | H01M 8/0258 429/457 |
| 2012/0301806 A1* | 11/2012 | Okabe | H01M 8/242 429/437 |

* cited by examiner

Primary Examiner — Scott J. Chmielecki
(74) Attorney, Agent, or Firm — Raymond Y. Chan; David and Raymond Patent Firm

(57) ABSTRACT

A fuel cell includes a cathode flow field plate, an anode flow field plate, and a membrane electrode assembly (MEA) sandwiched between the cathode and anode flow field plate. The cathode flow field plate has a flat side and an opposed channel side that the MEA is sandwiched between the anode flow field plate and the flat side of the cathode flow field plate. The cathode flow field plate further has a plurality of flow channels formed at the channel side for enabling fluid flowing along the flow channels to promote electrochemical reaction through the MEA so as to generate electrical energy.

5 Claims, 16 Drawing Sheets

B-B

C

A-A

D

PEM FUEL CELL STACK

CROSS REFERENCE OF RELATED APPLICATION

This is a Continuation-In-Part application that claims the benefit of priority under 35 U.S.C. § 119 to a non-provisional application, application Ser. No. 14/029,762, filed Sep. 17, 2013.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to the field of fuel cells, and more particularly in the field of polymer membrane fuel stacks for use in a proton exchange membrane fuel cell.

Description of Related Arts

A fuel cell is an energy source that converts the chemical energy from a fuel into electricity through a chemical reaction with oxygen or another oxidizing agent. Hydrogen is most commonly used as the fuel for these types of cells. One of the most representative embodiments of this fuel cell technology is the proton exchange membrane (PEM) fuel cell. This kind of fuel cell is comprised of a membrane electrode assembly (MEA) which is further comprised of a polymer electrolyte membrane which is sandwiched between two catalyst coated papers, which correspond to an anode and cathode. The membrane electrode assembly (MEA) is then sandwiched between a pair of flow field plates which direct the fuel and oxidant respectively. The fuel cell operates according to the following steps: hydrogen fuel is channeled through a field flow plate to the anode on one side of the fuel cell, while oxidant is channeled through a flow field plate to the cathode on the other side of the cell; a platinum catalyst is located on the anode side which causes the hydrogen to split into positive hydrogen ions and electrons; the polymer electrolyte membrane allows only positively charged ions to pass through into the cathode, while the negatively charged electros must travel along an external circuit to the cathode, wherein a electrical current is created; at the cathode, the electrons and positively charged hydrogen ions combine with oxygen to form water as the only product which is outputted from the cell. Additionally, as the oxygen is blown through the cathode flow field plate channels it also cools down the fuel cell. The cathode flow field plate furthermore may be exposed to the atmosphere in which case it is considered an "open cathode structure."

Conventional cathode flow field plate design is embodied as a saw or square-wave shaped structure in which air can be blown through by a blower or a fan. In comparison to water-cooled stacks, air-cooled stacks have a simpler balance of plan and an easier control strategy, and can be started up instantly.

One of the main flaws in an air-cooled proton exchange membrane fuel cell with polymer electrolyte membrane is thermal and water management. The polymer electrolyte membrane needs to be well hydrated in order to keep the internal electrical resistance of the membrane low. When air blows through the flow field plate channels, it cools the stack down, but also accelerates water evaporation leading to reduced water content in the membrane. Therefore, the fan speed needs to be carefully controlled (control strategy) according to current, ambient temperate, and relative humidity so that a balance can be reached. An inappropriate fan speed would reduce output power of the stack.

Another limitation of the air-cooled proton exchange membrane with polymer electrolyte membrane is hydrogen leaking. In the conventional design, the saw-side of the cathode flow field plate faces the membrane electrode assembly, which is comprised of the polymer electrolyte membrane sandwiched between the catalyst layers. Therefore, only the saw teeth are pressed onto the gasket, the rest of the areas are potential weak points for hydrogen leakage. The design usually limits the hydrogen working pressure to less than 0.5 bar·g. However, higher hydrogen pressure can help improve the kinetics, cell uniformity, response to load change and reduce the probability of hydrogen starvation which is extremely detrimental to fuel cell durability, but pressure above this level may cause a leak or gasket to burst.

FIG. 1 is perspective view of the prior art of a flow field plate assembly of a proton exchange membrane fuel cell. The cathode flow field plate A10 has a saw side A11 forming a plurality of channels A12 thereat and contacting with the MEA. As the cathode flow field plate A10 is used for the MEA, these channels A12 allow for air to be channel to help dissipate heat generated by the reaction process. To cope with greater heat strain the amount of air channeled through these channels A12 must be increase which lends to evaporation of the water, thereby increasing the electrical resistance in the MEA.

To create a seal for the channels A12, a gasket A20 is layered on the side of the saw side A11 of the cathode flow field plate A10 that a tip of the channel wall are extended to couple with the gasket A20, wherein the gasket A20 is sandwiched between the saw side A11 of the cathode flow filed plate A10 and the MEA.

FIG. 2 is a close-up perspective view of the cathode flow field plate assembly of a prior art of a proton exchange membrane fuel cell. This figure illustrates the weak points associated with the prior art of a proton exchange membrane fuel cell. The seal between the gasket A20 and the cathode flow field plate A10 is dependent upon the compression between the gasket A20 and the cathode flow field plate A10. Areas between the gasket A20 and the cathode flow field plate A10 where the tips of the channel walls come into contact with the gasket A20 are areas with a strong seal and when compression is increased the seal strength is increase allowing for a higher working pressure of the proton exchange membrane fuel cell. Areas with flow channel A12 are weak point WP areas due to the fact that there is no contact between the cathode flow field plate A10 and gasket A20, and thus there is no way for these areas to have their seal strength increased. When this seal strength between the tip of the channel wall of the cathode flow field plate A10 and the gasket A20 is enhanced leakage between the flow field plate A10 and the gasket A20 is prevented allowing for a higher working pressure and therefore improved fuel cell performance.

SUMMARY OF THE PRESENT INVENTION

The invention is advantageous in that it provides a fuel cell incorporating with a flow field plate assembly for use in a proton exchange membrane fuel cell to prevent any hydrogen leakage.

Another advantage of the invention is to provide a flow field plate assembly for allowing for a higher working pressure of the fuel cell and improving cooling efficiency. The performance improves for a greater power to weight ratio and enhances the overall viability of fuel cells as a prolific energy source.

Another advantage of the invention is to provide a flow field plate assembly for use in a proton exchange membrane fuel cell in which the proton exchange membrane fuel cell would be able to operate at a pressure greater than 0.5 bar·g without risk of hydrogen leakage and thus safer to operate.

Another advantage of the invention is to provide a design for flow field plate assembly for use in a proton exchange membrane fuel cell in which the proton exchange membrane fuel cell would be able to operate at a pressure greater than 0.5 bar·g so that kinetics, cell uniformity, response to load change are improved and the probability of hydrogen starvation is reduced in comparison to conventional fuel cells.

Another advantage of the invention is to provide a design for a flow field plate assembly for use in a proton exchange membrane fuel cell in which the air-cooling efficiency is improved allowing for the use of thinner flow field plates decreasing the overall weight to power ratio.

Another advantage of the invention is to provide a design for a flow field plate assembly for use in a proton exchange membrane fuel cell in which the sensitivity of membrane water content to fan speed is reduced.

Another advantage of the invention is to provide a design a flow field plate assembly for use in a proton exchange membrane fuel cell in which the newly designed flow field plate can be adapted to mount on most conventional proton exchange membrane fuel cells.

Another advantage of the invention is to provide a design from that the newly designed flow field plate assembly for use in a proton exchange membrane fuel cell is easy, simple, and cheap to manufacture.

Additional advantages and features of the invention will become apparent from the description which follows, and may be realized by means of the instrumentalities and combinations particular point out in the appended claims.

According to the present invention, the foregoing and other objects and advantages are attained by an Air-Cooled PEM fuel cell stack.

According to the present invention, the foregoing and other objects and advantages are attained by a fuel cell which comprises a membrane electrode assembly (MEA) and a flow field plate assembly.

The flow field plate assembly comprises an anode flow field plate and a cathode flow field plate that the MEA is sealed between the anode and cathode flow flied plates. The cathode flow field plate has a flat side and an opposed channel side that the MEA is sandwiched between the anode flow field plate and the flat side of said cathode flow field plate, wherein the cathode flow field plate further has a plurality of flow channels formed at the channel side for enabling fluid flowing along the flow channels to promote electrochemical reaction through the MEA so as to generate electrical energy.

The present invention further provides a fuel cell, comprising:

a membrane electrode assembly (MEA); and a flow field plate assembly which comprises an anode flow field plate and a cathode flow field plate, wherein the MEA is sealed between the anode flow field plate and cathode flow field plate, wherein the cathode flow field plate has an inner side and an outer side, wherein the inner side of the cathode flow field plate defines a flat side that the flat side of the cathode flow field plate is arranged for facing toward the MEA, the outer side of the cathode flow field plate defines a channel side, wherein the cathode flow field plate further has a plurality of flow channels formed at the channel side, wherein each of the flow channels is a through channel extended from the outer side to the inner side of the cathode flow field plate for enabling fluid to flow along the flow channels to the MEA so as to promote electrochemical reaction through the MEA and generate electrical energy.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 3:
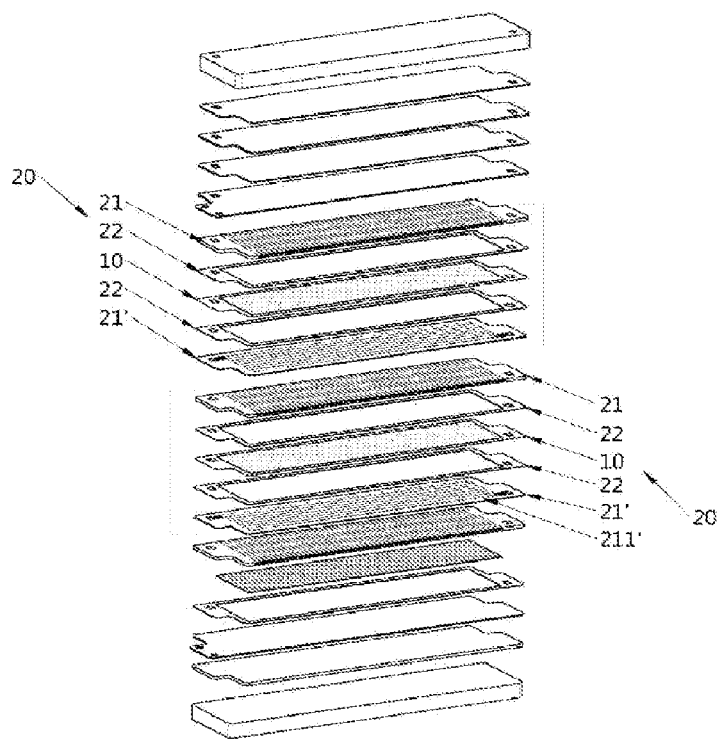
FIG. 3 is an exploded perspective view of a PEM fuel cell stack in the preferred embodiment of the present invention.

As shown in FIG. 3, a PEM fuel cell stack in the preferred embodiment of the present invention is illustrated. The fuel cell stack comprises one or more fuel cell unit being stacked with each other. According to the preferred embodiment, each fuel cell unit, which can be formed as a single fuel cell, comprises a membrane electrode assembly (MEA) 10 and a flow field plate assembly 20 which comprises two electrically conductive dipolar plates for sandwiching the MEA 10 therebetween.

The MEA 10 comprises a polymer electrolyte membrane, and catalysts coated at two sides of the polymer electrolyte membrane. Two gas diffusion layers are located at two outer sides of the MEA 10 respectively, wherein the gas diffusion layers are held between the electrically conductive dipolar plates of the flow field plate assembly 20 to form a unit cell assembly.

The two electrically conductive dipolar plates for sandwiching the MEA 10 therebetween are an anode flow field plate 21' and a cathode flow field plate 21.

Preferably, the fuel cell stack in actual practice the proton exchange membrane fuel cell comprises a plurality of stacked unit fuel assemblies possibly numbering into the hundreds depending on the electrical consumption requirements. Therefore, a typical fuel cell stack comprises a series of repeating group unit cell assemblies.

According to the preferred embodiment, the MEA 10 is sealed and sandwiched between the flow field plates 21, 21'. The anode flow field plate 21' has a flat side 211'. The cathode flow field plate 21 has a flat side 211 and an opposed channel side 212 that the MEA 10 is sandwiched between the flat sides 211', 211 of the flow field plates 21, 21'. The cathode flow field plate 21 further has a plurality of flow channels 213 formed at the channel side 212 for enabling fluid flowing along the flow channels 213 to promote electrochemical reaction through the MEA 10 so as to generate electrical energy. Accordingly, the fluid is the reactive gas such as hydrogen gas, oxygen gas, or air.

Figure 4:
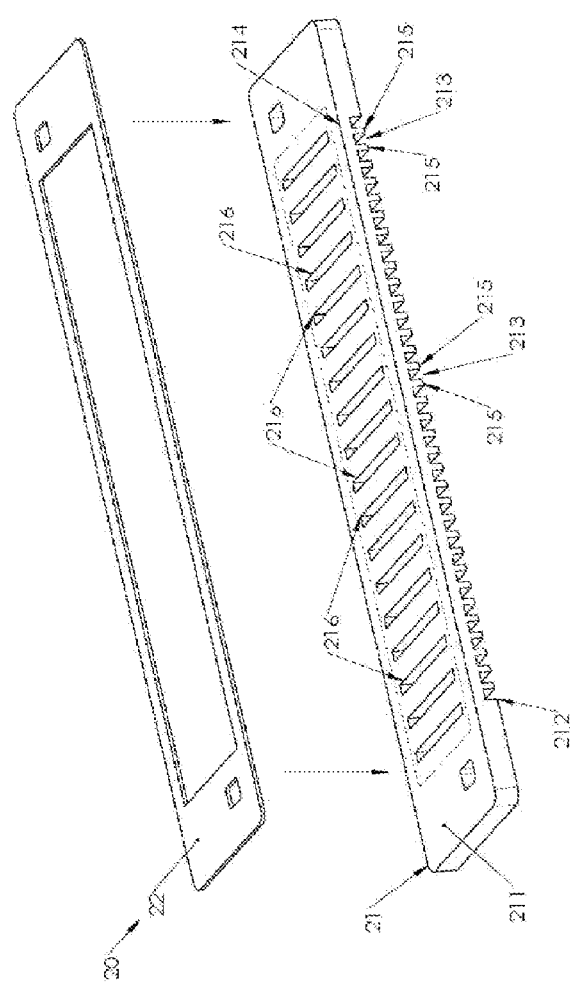
FIG. 4 is a perspective view of the flow field plate assembly of the fuel cell stack in the preferred embodiment of the present invention.

As shown in FIG. 4, the cathode flow field plate 21 comprises a base body 214 defining the flat side 211 at an inner side of the base body 214, and a plurality of guiding walls 215 spacedly extended from an outer side of the base body 214 to define the channel side 212 of the flow field plate 21. The flow channels 213 are extended from one side edge of the base body 214 to another opposed side edge thereof. Accordingly, the flat side 211 of the flow field plate 21 is a flat surface. The channel side 212 of the flow field plate 21 is a saw side thereof. In particular, each of the flow channels 213 is formed between two of the guiding walls 215. Preferably, the guiding walls 215 are parallel with each other and are integrally and perpendicularly extended from the outer side of the base body 214. The cross section of each of the guiding walls 215 is usually formed in rectangular, wherein each of the flow channels 213 has a uniform width. Alternatively, each of the guiding walls 215 has a trapezoid cross section that a width of the guiding wall 215 is gradually increased toward the base body 214. In other words, each of the flow channels 213 has a width gradually reduced toward the base body 214.

Therefore, the cathode flow field plate 21 further has a series of flows channels 213 which are spacedly and uniformly cut into a plate to create the cathode flow field plate. This flow field plate 21 may be constructed of any electron-conductive material that is also lightweight and strong. These flow channels 213 extend the entire lateral length of the flow field plate 21 and extend a predetermined depth into the flow field plate 21. The flow channels 213 also create ridges from the uncut material of the flow field plate 21 and these ridges are also spacedly placed and of uniform size.

Figure 5:
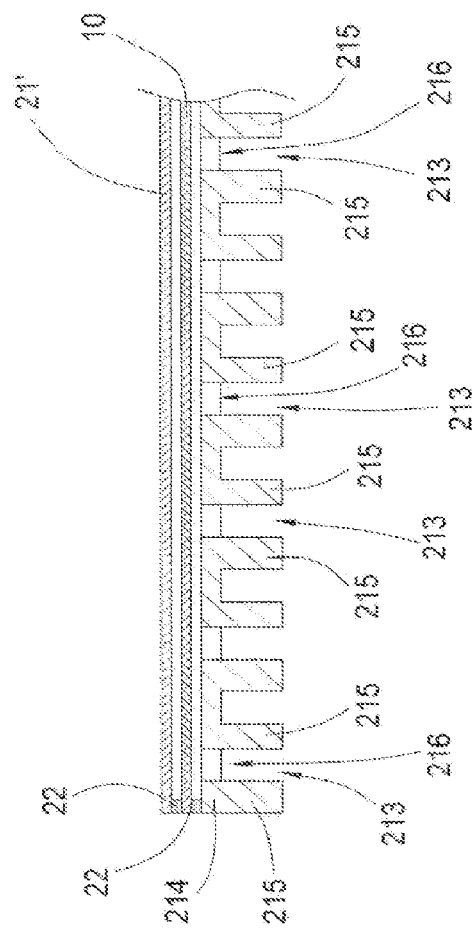
FIG. 5 is a sectional view of the flow field plate assembly of the PEM fuel stack in the preferred embodiment of the present invention.

As shown in FIGS. 4 and 5, the cathode flow field plate 21 further has a plurality of cooling channels 216 aligned and communicated with the flow channels 213 for dissipating heat of the flow field plate 21 when the fluid flows along the flow channels 213. Accordingly, each of the cooling channels 216 is an elongated slot evenly formed at the base body 214 to selectively communicate with the flow channels 213. In other words, when the cooling channels 216 are formed at the base body 214, the flow channels 213 will communicate with the cooling channels 216. Preferably, half of the total number of the flow channels 213 will communicate with the cooling channels 213 while the rest of the flow channels 213 will not communicate with the cooling channels 213.

In particular, the cooling channels 216 are through channels formed at the base body 214 to align with the flow channels 213 respectively, wherein the flat side 211 of the cathode flow field plate 21 is communicated with the channel side 212 thereof through the cooling channels 216. As a result, the heat dissipating area of the cathode flow field plate 21 will be substantially increased by the cooling channels 216 comparing with the same thickness of the conventional cathode flow field plate.

It should be appreciated that a plurality of cooling channels 216 are spacedly formed at the base body 214 to align with one corresponding flow channel 213. Accordingly, located in every other of the flow channels 213 is a through-all slot to form the cooling channel 216. This through-all slot allows for the cathode flow field plate to provide better efficient cooling effect. It is worth mentioning that the concept of the through-all slot located in the flow channel 213 of the cathode flow field plate 21 is not limited to this preferred embodiment but is extended to any embodiments of the cathode flow field plate 21 which contain a through-all slot cut into the flow channels 213 that allow for more efficient cooling of the MEA 10. This more efficient cooling allows for the objective of a decreased sensitivity of fan speed to be realized in this present invention. It is worth mentioning that with the increase of cooling efficiency and decreased sensitivity of fan speed the overall size of the fuel cell stack can be decreased while providing the same power output as a larger sized fuel cell constructed in accordance to the prior art. Therefore, the fuel cell of the present invention can be formed an Air-Cooled PEM fuel cell.

It is worth mentioning that the cooling channels 216 can be formed at every other of the flow channels 213 or at every flow channels 213. In other words, the number of cooling channels 216 can be selectively configured to incorporate with the flow channels 216. In addition, two or more cooling channels 216 can be formed at each flow channel 213 as well.

Figure 6:
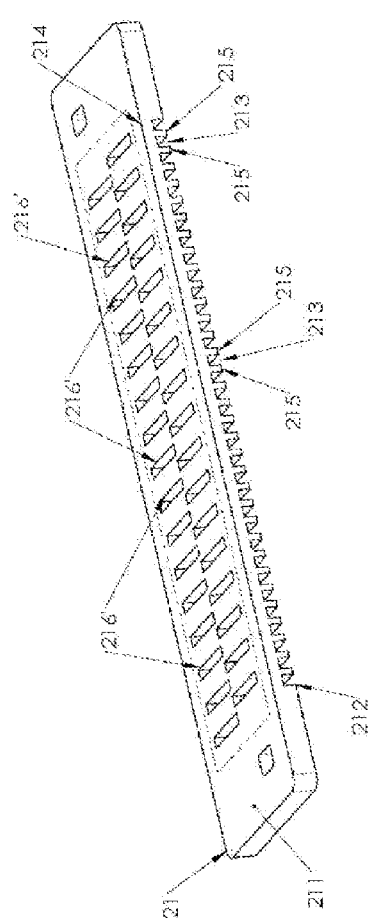
FIG. 6 illustrates a first alternative mode of the cooling channel of the flow field plate assembly of the PEM fuel stack in the preferred embodiment of the present invention.

FIG. 6 illustrates a first alternative mode of the cooling channel 216' of the flow field plate assembly, wherein the cooling channel 216' are formed at every flow channels 213 respectively. In particular, each of the cooling channels 216' formed at either the first portion or the second portion of the flow channel 213, wherein the cooling channels 216' at the first portion of the flow channels 213 are alternated with the cooling channels 216' at the second portion of the flow channels 213. In addition, the length of each of the cooling channels 216' at the first portion of the flow channels 213 equals to the length of each the cooling channels 216' at the second portion of the flow channels 213.

Figure 7:
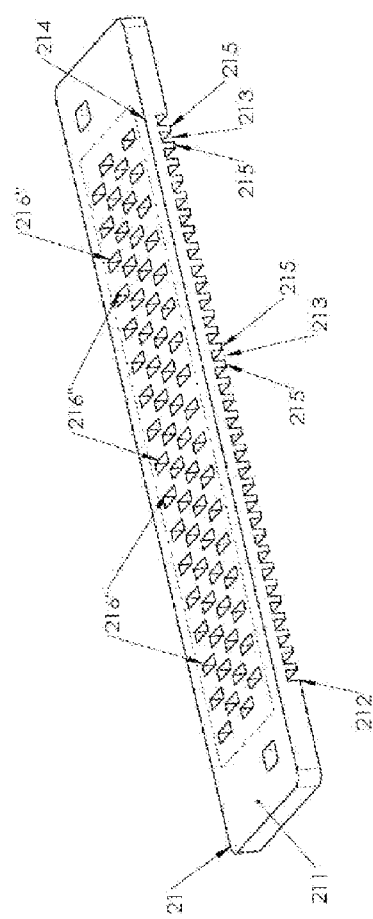
FIG. 7 illustrates a second alternative mode of the cooling channel of the flow field plate assembly of the PEM fuel stack in the preferred embodiment of the present invention.

FIG. 7 illustrates a second alternative mode of the cooling channel 216" of the flow field plate assembly, wherein two or more cooling channel 216" are formed at every flow channels 213 respectively. In particular, each of the flow channels 213 defines four equal portions that the cooling channels 216' formed at either the first and third portions or the second and fourth portions of the flow channel 213. Likewise, the cooling channels 216" at the first and third portions of the flow channels 213 are alternated with the cooling channels 216" at the second and fourth portions of the flow channels 213. All the cooling channels 216" have equal length.

Figure 1:
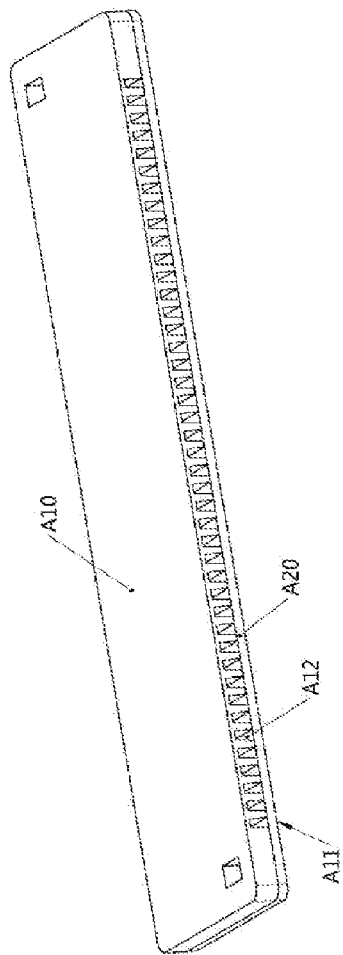
FIG. 1 illustrates a unit cell of the conventional proton membrane exchange fuel cell.
Figure 2:
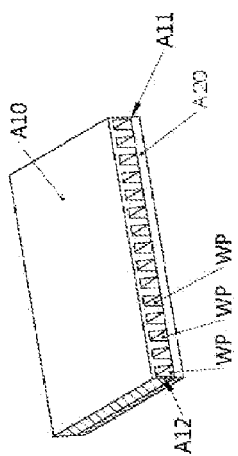
FIG. 2 illustrates the weak point of the conventional proton exchange membrane fuel cell.

It is worth mentioning that the thickness of the cathode flow field plate 21 can be substantially reduced by the structural configuration of the cooling channel 216. As shown in FIGS. 1 and 2 as an example, if the flow channel of the conventional plate is designed to have a 3 mm depth, a minimum 4 mm thick plate must be used in order to maintain the mechanical strength. In view of the present invention, if the flow channel 213 of the cathode flow field plate 21 is designed to have a 3 mm depth as an example, the thickness of the cathode flow field plate 21 will be configured to be 3 mm because of the cooling channel 216. In other words, the cooling channel 216 can be configured as a portion of the flow channel 213, so that the thickness of the cathode flow field plate 21 equals to the depth of the flow channel 213. In other words, the cathode flow field plate 21 of the present invention can be configured to be thinner than the conventional plate in order to achieve the same cooling area because the structural configuration of the cooling channel 216 of the present invention enables the use of the entire cross section of the cathode flow field plate 21 to dissipate the heat thereof when the air passes through the flow channels 213. As it is mentioned above, having the same thickness of the conventional plate, the cathode flow field plate 21 of the present invention will provide increased heat dissipating area for heat dissipation.

Preferably, a lateral length of each of the flow channels 213 is longer than a lateral length of the cooling channel 216. The lateral length of each of the flow channels 213 is the lateral length of flow field plate 21. In addition, a width of each of the flow channels 213 equals to or is larger than a width of the cooling channel 216. As shown in FIGS. 4 and 5, the through-all slots (the cooling channels 216) as well as the ridges created from the uncut material are more easily viewed.

According to the preferred embodiment, the flow field plate assembly 20 further comprises two sealing gaskets 22 sealed the cathode and anode flow field plates 21, 21' with the MEA 10. In particular, each of the sealing gaskets 22 is sealed and sandwiched between the flat side 211, 211' of the cathode and anode flow field plate 21, 21' and the MEA 10. In other words, one of the sealing gaskets 22 is sealed and sandwiched between the anode flow field plate 21' and the MEA 10 while another sealing gasket 22 is sealed and sandwiched between the cathode flow field plate 21 and the MEA 10.

As shown in FIG. 3, each of the sealing gaskets 22 has a hollow structure that seals at a peripheral edge of the flat side 211 of the cathode flow field plate 21. In other words, the sealing gasket 22 has a hollow center region for the fluid, such as air, to flow therethrough. The sealing gasket 22 also has a corresponding size and shape matching with the flat side 211 of the cathode flow field plate 21. As shown in FIG. 3, the sealing gasket 22 has a rectangular shape defining two lateral edge portions and two longitudinal edge portions to encircle the peripheral edge of the flat side 211 of the cathode flow field plate 21. Preferably, each of the sealing gaskets 22 is adhered between the flat side 211 of the cathode flow field plate 21 and the MEA 10.

It is worth mentioning that the cooling channels 216 are uncovered by the sealing gasket 22. In other words, the cooling channels 216 are extended within the peripheral edge of the cathode flow field plate 21 and are extended between two longitudinal edge portions of the sealing gasket 22.

FIG. 3 also depicts that with this design of the fuel cell stack in the preferred embodiment of the present invention that, despite what type of sealing method is used, such as an adhesive gasket, that gasket is under compression everywhere. It is worth mentioning that since the MEA 10 is sealed between the flat side 211, 211' of the cathode and anode flow field plate 21, 21' via the sealing gaskets 22, a closed environment is created for the hydrogen to flow, so as to seal the anode flow field plate 21' to prevent hydrogen leakage. Accordingly, the sealing gasket 22 of the present invention could be an endless ring or adhesive gasket. Adhesive gaskets work with moderate success but will start to develop leaks under moderate gas pressure if not compressed. O-rings provide a strong seal under very high pressures, but require a firm compression or they will not seal at all.

When the flow field plate 21 is used as the cathode flow field plate in the fuel cell, the flat side 211 of the cathode flow field plate 21 is mounted to the MEA 10. The PEM fuel cell is configured to be open to atmosphere, so in addition to the oxidant being blown through the flow channels 213 of the cathode flow field plate 21, the cathode structure configuration with the cooling channels 216 contributes to increase efficiency of air-cooling because the heat is dissipated and dissociated through the cooling channels 216. With the increased cooling efficiency this allows for the cathode flow field plate 21 to be much thinner as compared with the conventional art. The advantageous implications of a thinner and lighter fuel cell stack are that they allow the fuel cell stack to be much more portable than prior art.

In particular, the cooling channels 216 are formed at the cathode flow field plate 21 to reduce the sensitivity of membrane hydration to fan speed. The cooling channels 216 are formed at every other flow channels 213. When air passes through the flow channels 213 of the cathode flow field plate 21, the air flow will only takes the heat away from the cathode flow field plate 21 via the cooling channels 216. The flow channels 213 without the cooling channels 216 will keep the water content of the MEA 10 since the air will not contact with the MEA 10.

In addition, the cathode flow field plate of the present invention will also provide thermal and water management for the fuel cell. Accordingly, the MEA 10 needs to be well hydrated in order to keep the internal resistance down. When the air blows through the flow channels 213, it only cools the cathode flow field plate 21 down via the cooling channels 216 without accelerating water evaporation leading to reduce water content in the MEA 10.

It is worth mentioning that the air flow will not contact with the MEA 10 through the flow channels 213 without the cooling channels 216 provided thereat when the air flow passes through the flow channels 213. Therefore, when the fan speed is increased or decreased, only part of the air flow directly impacts the water content, while all the air flow still has the cooling effect. In other words, the cell voltage of the fuel cell becomes less sensitive to the fan speed, resulting in a more stable output voltage when fan control is interfered by electrical noise.

The adhesive sealing gasket 22 is sealed at the flat side 211' of the anode flow field plate 21' to prevent the hydrogen gas from leaking during operation. The sealing gasket 22 has an adhesive that is applied all around the edge of the flat side 211' of the anode flow field plate 21' so that when affixed to the anode flow field plate 21' it is adhered all around the edges of the anode flow field plate 21'. This adhesive method creates a stronger seal than the previous art provided enough compression is applied. The adhesive sealing gasket 22 also adheres the MEA 10 to the anode flow field plate 21' sealing the hydrogen inside. With the weak points eliminated and the risk of hydrogen leakage reduced the MEA 10 can then be operated at a higher hydrogen pressure to achieve the listed goals of improved kinetics, cell uniformity, response to load change and reduction in the probability of hydrogen starvation in comparison to conventional fuel cells. The additional implication of a high operating pressure are that a smaller fuel cell stack would be able to generate the same amount of power as a larger fuel cell stack of the prior art.

It is worth mentioning that there is absolutely no weak point for the gas to leak. When the hydrogen pressure is increased up to 3 bar·g (i.e. six times more pressure than the conventional hydrogen pressure), there is no hydrogen leakage being detected. The open circuit voltage of every cell unit is above 1.0V. The stack can be run for a few thousand hours with the very stable performance. The standard deviation of the cell voltage has also been improved due to increased hydrogen pressure, reaching 5 mV at rated output, while the standard deviation of the conventional cell voltage is reported at 10-12 mV. It is worth mentioning that the smaller the standard deviation is the closer the cell voltages are. Therefore, the uniformity of the cell voltages in the stack of the present invention will be obtained by using higher hydrogen pressure. It is worth mentioning that the uniformity of the cell voltages isn't solely dependent on the hydrogen pressure, but higher hydrogen pressure does help to obtain the uniformity of the cell voltages. In other words, the output stack voltage is also very steady. According to the preferred embodiment, the hydrogen pressure can be increased above 0.5 bar·g which is the common limit of the hydrogen pressure for the conventional fuel cell.

Figure 8A:
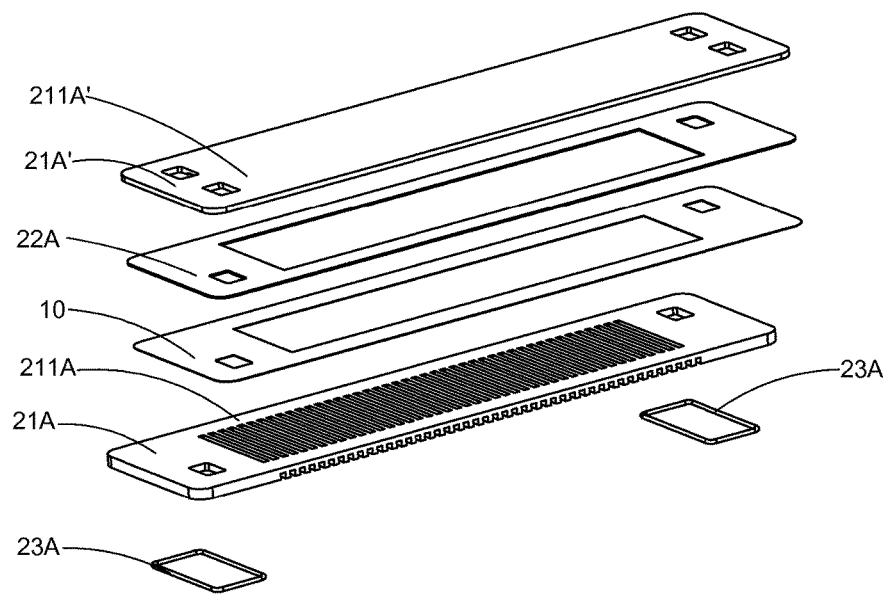
FIG. 8A is an exploded perspective view of an alternative mode of the flow field plate assembly of the PEM fuel stack in the preferred embodiment of the present invention.
Figure 8B:
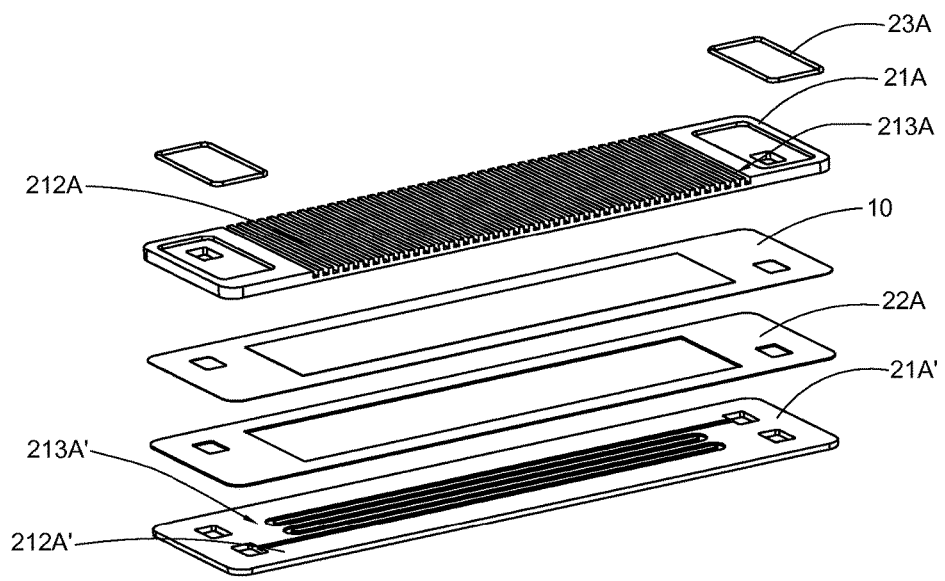
FIG. 8B is another exploded perspective view of an alternative mode of the flow field plate assembly of the PEM fuel stack in the preferred embodiment of the present invention.
Figure 8C:
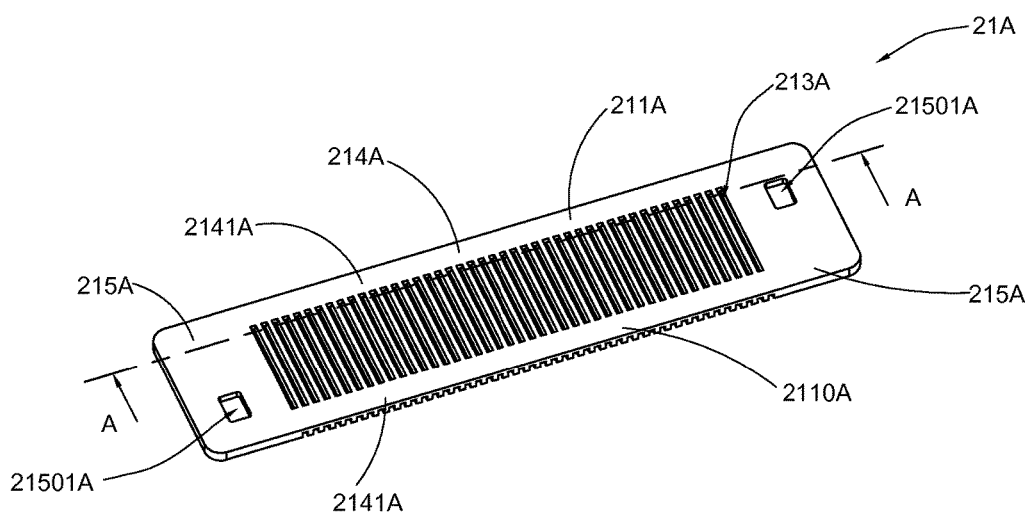
FIG. 8C is a top view of the cathode flow field plate of the above alternative mode of the flow field plate assembly according to the preferred embodiment of the present invention.
Figure 8D:
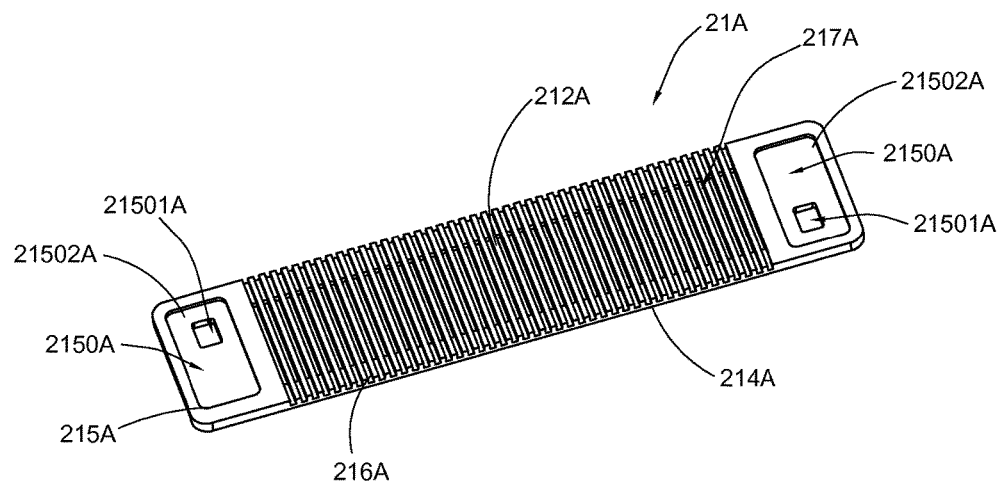
FIG. 8D is a bottom view of the cathode flow field plate of the above alternative mode of the flow field plate assembly according to the preferred embodiment of the present invention.
Figure 8E:
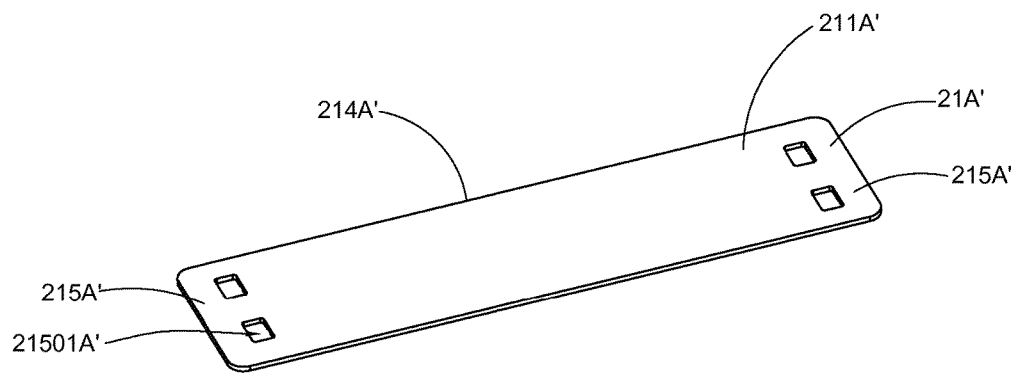
FIG. 8E is a top view of the anode flow field plate of the above alternative mode of the flow field plate assembly according to the preferred embodiment of the present invention.
Figure 8F:
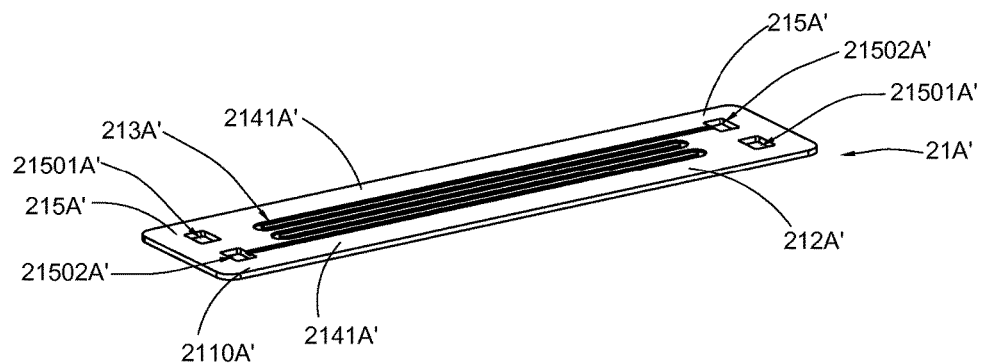
FIG. 8F is a bottom view of the anode flow field plate of the above alternative mode of the flow field plate assembly according to the preferred embodiment of the present invention.
Figure 8G:
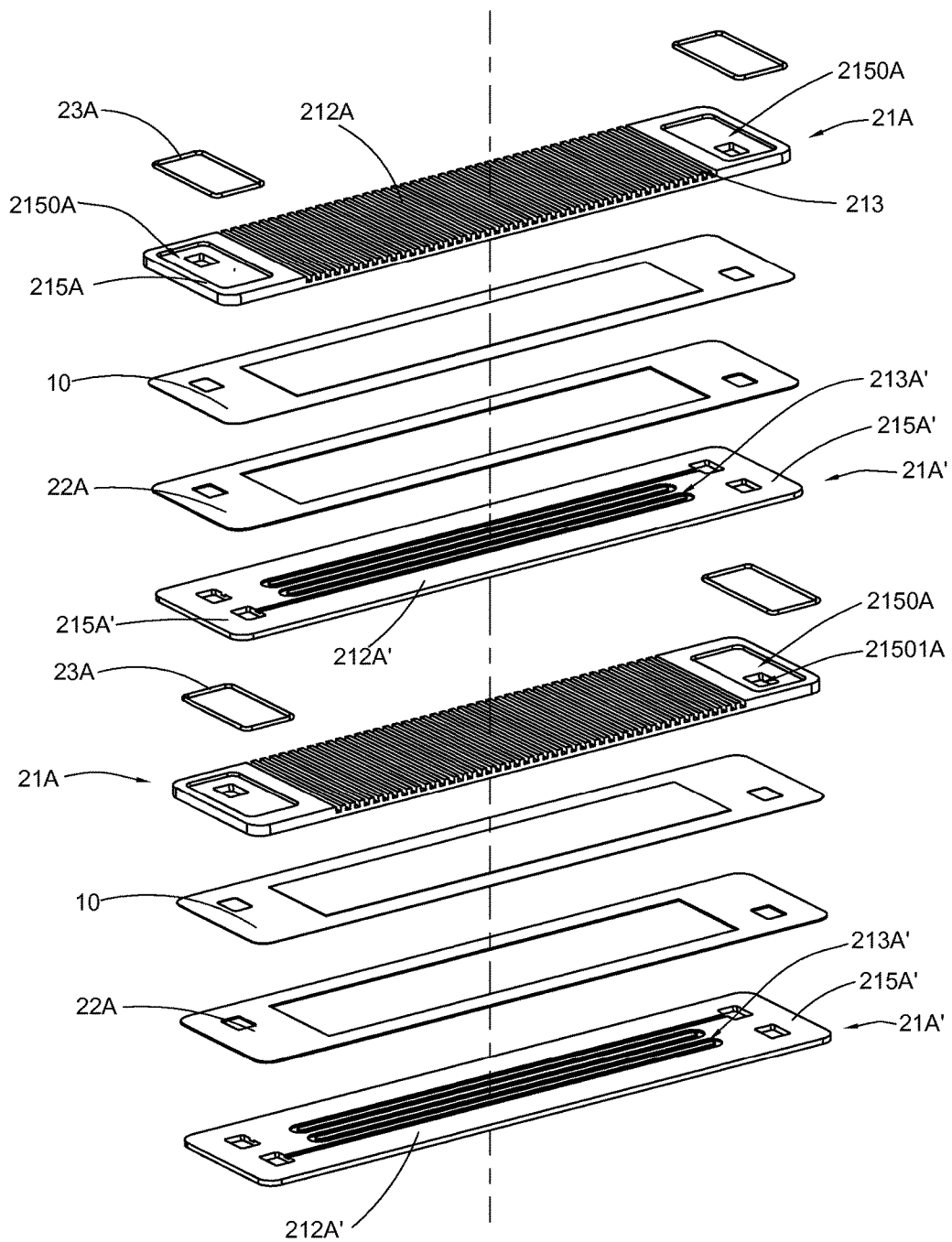
FIG. 8G illustrates the PEM fuel stack according to the preferred embodiment of the present invention, wherein the PEM fuel stack employs two above alternative modes of the flow field plate assembly.
Figure 8H:
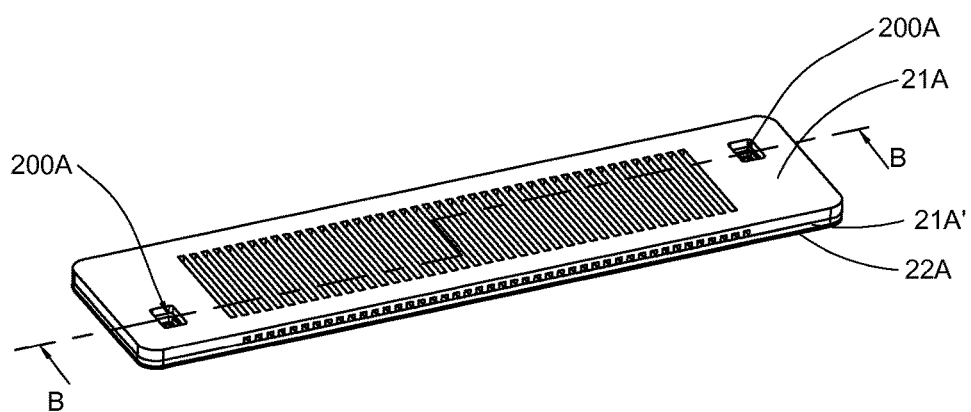
FIG. 8H illustrates the cathode flow field plate the anode flow field plate of the above alternative mode of the flow field plate assembly are stacked with each other in the PEM fuel stack according to the preferred embodiment of the present invention.
Figure 8M:
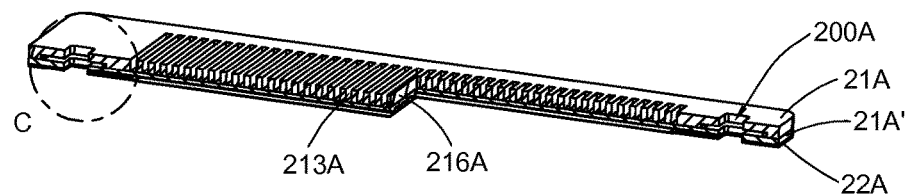
FIG. 8M is a partial sectional view of the PEM fuel stack according to the preferred embodiment of the present invention.
Figure 8N:
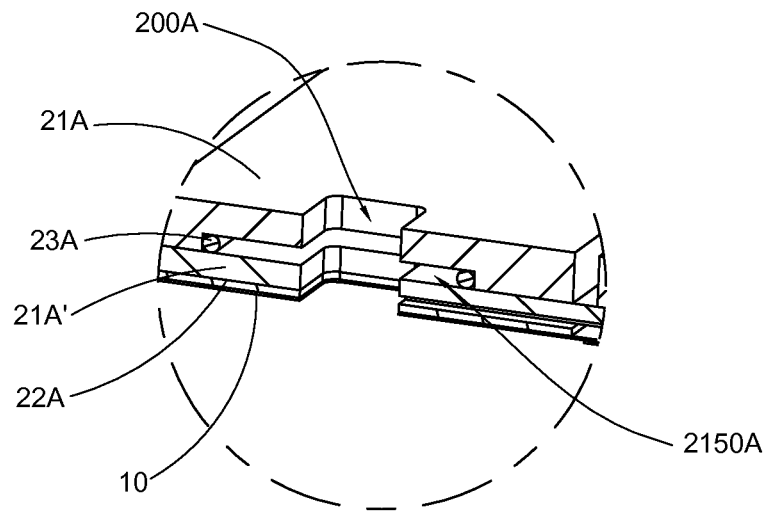
FIG. 8N is a partial enlargement view of the PEM fuel stack according to the preferred embodiment of the present invention.
Figure 8O:
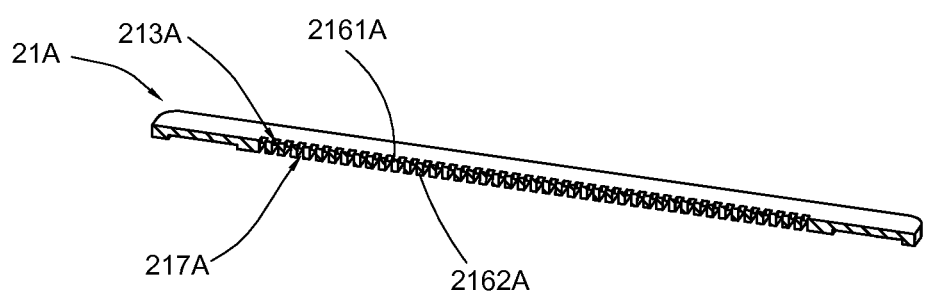
FIG. 8O is a sectional view of the cathode flow field plate of the above alternative mode of the flow field plate assembly according to the preferred embodiment of the present invention.

FIGS. 8A to 8O illustrate an alternative mode of the flow field plate assembly 20, wherein the flow field plate assembly 20A comprises an anode flow field plate 21A' and a cathode flow field plate 21A, and the MEA 10 of the fuel cell is sealed between the anode flow field plate 21A' and cathode flow field plate 21A, wherein the cathode flow field plate 21A has an inner side and an outer side, wherein the inner side of the cathode flow field plate 21A defines a flat side 211A that the flat side 211A of the cathode flow field plate 21A is arranged for facing toward the MEA 10, the outer side of the cathode flow field plate 21A defines a channel side 212A, wherein the cathode flow field plate 21A further has a plurality of flow channels 213A formed at the channel side 212A, wherein each of the flow channels 213A is a through channel extended from the outer side to the inner side of the cathode flow field plate 21A for enabling fluid to flow along the flow channels 213A to the MEA 10 so as to promote electrochemical reaction through the MEA 10 and generate electrical energy. In other words, each of the flow channels 213A can be extended from the flat side 211A of the cathode flow field plate 21A to the channel side 212A of the cathode flow field plate 21A such that the fluid can flow along the flow channels 213A to the MEA 10.

As shown in FIGS. 8D and 8O, the cathode flow field plate 21A further has a plurality of cooling channels 217A selectively aligned with the flow channels 213A for dissipating heat of the cathode flow field plate 21A when the fluid flows along the flow channels 213A. Preferably, the cooling channels 217A are through channels evenly formed at the cathode flow field plate 21A to align with the flow channels 213A.

As shown in FIGS. 8C to 8F, the cathode flow field plate 21A comprises a cathode plate body 214A and two first end portions 215A, wherein the cathode plate body 214A is extended between the first end portions 215A, wherein the cathode plate body 214A comprises two transverse edges 2141A and a plurality of guiding walls 216A spacedly extended between the two transverse edges 2141A, wherein every two neighboring guiding walls 216A define the flow channel 213A and the cooling channel 217A communicated with the flow channel 213A therebetween, wherein each of the cooling channels 217A is provided along the flow channel 213A to enable the fluid to flow through the cooling channel 217A. Preferably, the first end portions 215A of the cathode flow field plate 21A and the transverse edges 2141A define a successive flat surface 2110A of the flat side 211A of the cathode flow field plate 21A such that when the fuel cell is stacked, the flat side 211A of the cathode flow field plate 21A is capable of providing a flat support on the MEA 10 so as to enable the MEA 10 to bias against on the anode flow field plate 21A'.

As shown in FIGS. 8D and 8O, each of the guiding walls 216A comprises an upper end 2161A and a lower end 2162A extended from the upper end 2161A, wherein every two neighboring guiding walls 216A define the flow channel 213A between the upper ends 2161A of the two neighboring guiding walls 216A and the cooling channel 217A between the lower ends 2162A of the two neighboring guiding walls 216A. Therefore, the cooling channel 217A is communicated with the flow channel 213A to define the through channel for allowing the fluid to flow therethrough. Preferably, the lower end 2162A is shorter than the upper end 2161A such that the cooling channel 217A has a length shorter than the flow channel 213A. Alternatively, the lower end 2162A is longer than the upper end 2161A such that the cooling channel 217A has a length longer than the flow channel 213A.

As shown in FIGS. 8E to 8F, the anode flow field plate 21A' of the flow field plate assembly 20A has an inner side and an outer side, wherein the inner side of the anode flow field plate 21A' defines a channel side 212A' and an opposite flat side 211A', wherein the channel side 212A' of the anode flow field plate 21A' is arranged for facing toward the MEA 10, wherein the channel side 212A' of the anode flow field plate 21A' defines at least one fuel channel 213A' facing towards the MEA 10 to enable the fuel, for example the hydrogen fuel to be supplied for the MEA 10 therethrough. The fuel channel 213A' is indented on the channel side 212A' of the anode flow field plate 21A'. Preferably, the anode flow field plate 21A' comprises two second end portions 215A' and an anode plate body 214A' extended between the second end portions 215A', wherein the anode plate body 214A' and the second end portions 215A' of the anode flow field plate 21A' define a successive sealing surface 2120A' formed at the channel side 212A' of the anode flow field plate 21A'.

As shown in FIGS. 8A, 8B and 8G, the flow field plate assembly 20A further comprises a sealing gasket 22A provided between the MEA 10 and the anode flow field plate 21A', wherein the sealing gasket 22A is provided on the sealing surface 2120A' of the channel side 212A' of the anode flow field plate 21A'.

As shown in FIGS. 8C to 8G, when the fuel cell is stacked, every two neighboring fuel cells are assembled with each other, and the flat side 211A' of the anode flow field plate 21A' of the former fuel cell is coupled with the channel side 212A of the cathode flow field plate 21A of the next fuel cell, wherein the flat side 211A' of the anode flow field plate 21A' of the former fuel cell and the channel side 212A of the cathode flow field plate 21A of the next fuel cell define two flow passages 2150A therebetween, and the flow passages 2150A are respectively communicated with the fuel channel 213A' to enable the fuel to flow from one flow passage 2150A to another flow passage 2150A through the fuel channel 213A'.

As shown in FIGS. 8C to 8G, each of the flow passages 2150A has two openings 21501A', 21502A', wherein the sealing gasket 22A is provided at the channel side 212A' of the anode flow field plate 21A' and surrounds the openings 21501A', 21502A' of the flow passages 2150A to prevent the leakage of the fuel through the gaps between the MEA 10 and the channel side 212A' of the anode flow field plate 21A'. As shown in FIGS. 8C to 8G, the openings 21502A' of the flow passages 2150A are respectively communicated with the fuel channel 212A' to allow the fuel to flow from one flow passage 2150A to another flow passage 2150A through the fuel channel 213A'. Accordingly, the two openings 21501A', 21502A' are two through slots formed at each of the second end portions 215A' of the anode flow field plate 21A' and are aligned with each other. In particular, the fuel channel 213A' is formed in a zigzag configuration between the second end portions 215A' of the anode flow field plate 21A' to prolong the traveling distance of the fuel, wherein two ends of the fuel channel 213A' are communicatively extended to the second opening 21502A' as shown in FIG. 8F. In other words, the fuel is guided to flow between the two second openings 21502A' at the second end portions 215A' of the anode flow field plate 21A' through the fuel channel 231A'.

As shown in FIGS. 8C to 8G, each of the flow passage 2150A is formed at the channel side 212A of the cathode flow field plate 21A and a sealing groove 21502A is provided to surround the flow passage 2150A. Accordingly, the sealing groove 21502A is an indented cavity formed at the channel side 212A of the cathode flow field plate 21A to define the flow passage 2150A. The flow field plate assembly 20A further comprises two sealing rings 23A provided respectively in the sealing grooves 21502A to prevent the leakage of the fuel from the gaps between the flat side 211A' of the anode flow field plate 21A' and the channel side 212A of the cathode flow field plate 21A. As shown in FIGS. 8C to 8G, the flow passage 2150A further has a third opening 21501A formed through the cathode flow field plate 21A. It is worth mentioning that when a plurality of fuel cell are stacked with each other to define a fuel cell stack, the third openings 21501A of the flow passages 2150A of each of the first end portions 215A of the cathode flow field plate 21A and the 21502A' of the flow passages 2150A of the corresponding second end portion 215A' of the anode flow field plate 21A' define a fuel passage 200A such that the hydrogen fuel can be supplied through the two fuel passages 200A of the fuel cell stack.

Alternatively, the flow passages 2150A are respectively formed at the flat sides 211A' of the anode flow field plate 21A' and two sealing groove 21502A are configured to surround the flow passages 2150A respectively, wherein the flow field plate assembly 20A further comprises two sealing rings 23A provided respectively in the sealing grooves 21502A to prevent the leakage of the fuel from the gaps between the flat side 211A' of the anode flow field plate 21A' and the channel side 212A of the cathode flow field plate 21A.

Figure 9A:
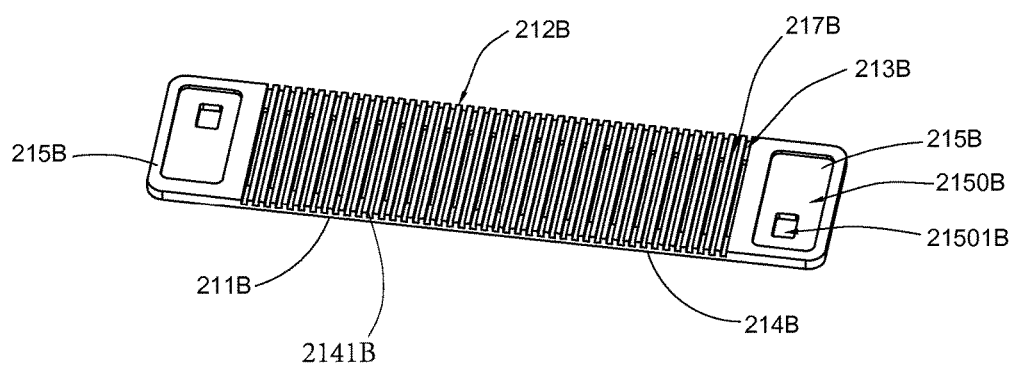
FIG. 9A illustrates another alternative mode of the cathode flow field plate of the flow field plate assembly of the PEM fuel stack in the preferred embodiment of the present invention.
Figure 9B:
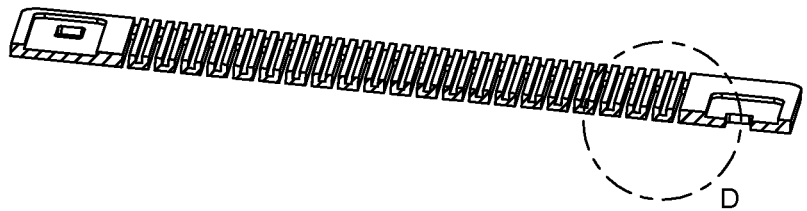
FIG. 9B is a sectional view of the above alternative mode of the cathode flow field plate of the flow field plate assembly according to the preferred embodiment of the present invention.
Figure 9C:
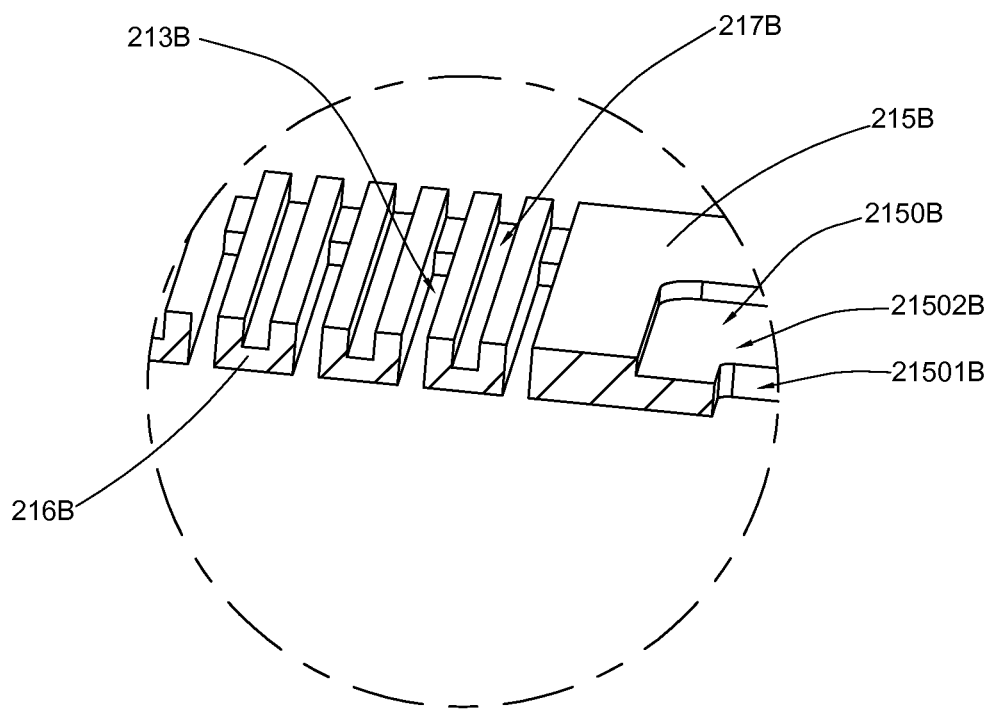
FIG. 9C is a partial enlargement view of the above alternative mode of the cathode flow field plate of the flow field plate assembly of the PEM fuel stack in the preferred embodiment of the present invention.

FIGS. 9A to 9C illustrate an alternative mode of the cathode flow field plate 21A of the flow field plate assembly 20A, wherein the cathode flow field plate 21B comprises two first end portions 215B and a cathode plate body 214B extended therebetween, wherein the cathode plate body 214B comprises two transverse edges 2141B and a plurality of guiding walls 216B spacedly extended between the two transverse edges 2141B, wherein every two neighboring guiding walls 216B define a flow channel 213B therebetween, and each of the guiding walls 216B defines a cooling channel 217B formed at the channel side 212B, wherein the cooling channel 217B is extended from one transverse edge 2141B to another transverse edge 2141B of the cathode plate body 21B to enable the fluid to flow through the cooling channel 217B. Preferably, each of two first end portions 215B defines a flow passage 2150B having a third opening 21501B and a sealing groove 21502B therein. In other words, located in every other of the flow channels 213B is a through-all slot to form the cooling channel 217B, wherein the flowing channel 213B and the cooling channels 217B are located in an alternating manner.

It should be appreciated that the preferred embodiment of the present invention of the fuel cell, the material in which the anode plate and cathode plate are comprised of is generally a conductive type of metal. Characteristic of the metal are that it needs to be strong, lightweight, and electron-conducting, but the material is not restricted to metal. Materials such as conductive composites enhanced with such materials as graphite, carbon black, carbon fiber, and/or carbon nanotubes may be utilized in the construction of the present invention.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A fuel cell, comprising:
a membrane electrode assembly (MEA); and
a flow field plate assembly which comprises a cathode flow field plate and an anode flow field plate that said MEA is sealed between said cathode flow field plate and said anode flow field plate; wherein said cathode flow field plate has a flat side at an inner side that faces toward said MEA, an opposed channel side, and a plurality of flow channels formed on said channel side of said cathode flow field plate, wherein said flow channels are through channels extended from said channel side of said cathode flow field plate to said flat side thereof for enabling fluid to flow along said flow channels to said MEA so as to promote electrochemical reaction through said MEA and generate electrical energy; wherein said anode flow field plate has a flat side at an inner side, an opposed channel side at an outer side that seals with said MEA, and a fuel channel formed on said channel side of said anode flow field plate for enabling the fuel to be supplied for the MEA therethrough, wherein said anode flow field plate further has two openings formed at two opposed end portions of said anode flow field plate, wherein said openings are through slots extended through said inner side and said outer side of said anode flow field plate, wherein two ends of said fuel channel are extended to said openings respectively for guiding the fuel to flow between said openings through said fuel channel, wherein said fuel channel is formed in a zigzag configuration and is indented on said channel side of said anode flow field plate, wherein said cathode flow field plate further has a plurality of cooling channels formed on said channel side of said cathode flow field plate; and
two sealing gaskets, one of said sealing gaskets being sealed between said flat side of said cathode flow field plate and said MEA, another said sealing gasket being sealed between said flat side of said anode flow field plate and said MEA, wherein said cooling channels are uncovered by said corresponding sealing gasket.

2. The fuel cell, as recited in claim 1, wherein said anode flow field plate further has an anode plate body extended between said end portions, wherein said anode plate body and said end portions of said anode flow field plate define a successive sealing surface formed at said channel side of said anode flow field plate, wherein said sealing gasket is provided on said sealing surface of said anode flow field plate.

3. The fuel cell, as recited in claim 2, wherein when two or more of said fuel cells are stacked at a position that a former fuel cell is stacked on a next fuel cell, said flat side of said anode flow field plate of the former fuel cell is coupled at said channel side of said cathode flow field plate of the next fuel cell, wherein said flat side of said anode flow field plate of the former fuel cell and said channel side of said cathode flow field plate of the next fuel cell define two flow passages therebetween, and said flow passages are respectively communicated with said fuel channel for enabling the fuel to flow from one flow passage to another flow passage through said fuel channel.

4. The fuel cell, as recited in claim 3, wherein each of said flow passages has two openings, wherein said sealing gasket is provided at said channel side of said anode flow field plate to surround said openings of said flow passages for preventing the leakage of the fuel through a gap between said MEA and said channel side of said anode flow field plate.

5. The fuel cell, as recited in claim 4, wherein each of said flow passage is formed at said channel side of said cathode flow field plate, wherein a sealing groove is provided to surround said flow passage at a position that said sealing groove is an indented cavity formed at said channel side of said cathode flow field plate to receive said flow passage within said indented cavity, wherein said flow field plate assembly further comprises two sealing rings provided respectively in said sealing grooves for preventing the leakage of the fuel from a gap between said flat side of said anode flow field plate and said channel side of said cathode flow field plate.

* * * * *